(12) United States Patent
Yabuuchi

(10) Patent No.: US 9,374,487 B2
(45) Date of Patent: Jun. 21, 2016

(54) IMAGE PROCESSING APPARATUS, IMAGE PROCESSING METHOD, AND NON-TRANSITORY COMPUTER-READABLE STORAGE MEDIUM

(71) Applicant: KYOCERA Document Solutions Inc., Osaka-shi, Osaka (JP)

(72) Inventor: Yasuyuki Yabuuchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/553,614

(22) Filed: Nov. 25, 2014

(65) Prior Publication Data
US 2015/0156358 A1 Jun. 4, 2015

(30) Foreign Application Priority Data

Nov. 29, 2013 (JP) ................................ 2013-247508
Nov. 25, 2014 (JP) ................................ 2014-237434

(51) Int. Cl.
*H04N 1/00* (2006.01)
*H04N 1/387* (2006.01)

(52) U.S. Cl.
CPC ......... *H04N 1/00803* (2013.01); *H04N 1/0071* (2013.01); *H04N 1/00708* (2013.01); *H04N 1/00718* (2013.01); *H04N 1/00774* (2013.01); *H04N 1/00809* (2013.01); *H04N 1/00816* (2013.01); *H04N 1/3877* (2013.01)

(58) Field of Classification Search
CPC .......... H04N 1/00718; H04N 1/00737; H04N 1/00761; H04N 1/00779; H04N 1/00803; H04N 2201/0094; H04N 2201/3269; H04N 1/00809; H04N 2201/04743; H04N 1/00708; H04N 1/3877; H04N 1/00774; H04N 1/00816; H04N 1/0071; B41J 11/009; B41J 11/46; G06K 9/00476
USPC ................................................ 358/3.26, 1.15
See application file for complete search history.

(56) References Cited

U.S. PATENT DOCUMENTS

2012/0127536 A1* 5/2012 Lin .............................. 358/3.26
2013/0070273 A1* 3/2013 Nagata ......................... 358/1.13

FOREIGN PATENT DOCUMENTS

JP 10229484 A 8/1998

* cited by examiner

*Primary Examiner* — Iriana Cruz
(74) *Attorney, Agent, or Firm* — Alleman Hall McCoy Russell & Tuttle LLP

(57) ABSTRACT

A reading control portion reads an image in reading range including image regions of an entire document sheet image in both state where a document sheet is not tilted and a state where the document sheet is tilted at predetermined maximum tilt angle. A first blank sheet determination processing portion is able to determine whether the image read by the reading control portion is a blank sheet image, based on an image of a first determination region which is included in both the image region of the entire document sheet image in the state where the document sheet is not tilted and the image region of the entire document sheet image in the state where the document sheet is tilted at the maximum tilt angle. A first tilt correction processing portion executes no tilt correction processing for the document sheet image when the read image is a blank sheet image.

10 Claims, 9 Drawing Sheets

IMAGE PROCESSING APPARATUS, IMAGE PROCESSING METHOD, AND NON-TRANSITORY COMPUTER-READABLE STORAGE MEDIUM

INCORPORATION BY REFERENCE

This application is based upon and claims the benefit of priority from the corresponding Japanese Patent Application No. 2013-247508 filed on Nov. 29, 2013, and Japanese Patent Application No. 2014-237434 filed on Nov. 25, 2014, the entire contents of which are incorporated herein by reference.

BACKGROUND

The present disclosure relates to an image processing apparatus having a function of performing blank sheet determination as to whether a document sheet is a blank sheet.

Conventionally, an image processing apparatus has been proposed which has a blank sheet determination function of determining whether an image of a read document sheet is a blank sheet image, and deleting image information of the image when the image is determined as a blank sheet image. In the image processing apparatus having such a blank sheet determination function, a determination region to be subjected to blank sheet determination is previously set in a document sheet image corresponding to one page. For example, a user is allowed to input distances from top, bottom, left, and right sides of a document sheet, and when the distances are input, a rectangular region inward from the respective sides by the input distances is set as the determination region. It is also conceivable that the distances from the top, bottom, left, and right sides of the document sheet have previously been set by initial setting. Then, blank sheet determination is performed by determining whether rendered images such as characters, graphics, and the like exist in the determination region.

SUMMARY

An image processing apparatus according to one aspect of the present disclosure includes a reading control portion, a first blank sheet determination processing portion, and a first tilt correction processing portion. The reading control portion reads an image in a reading range including image regions of an entire document sheet image in both a state where a document sheet is not tilted and a state where the document sheet is tilted at a predetermined maximum tilt angle. The first blank sheet determination processing portion is able to determine whether the image read by the reading control portion is a blank sheet image, based on an image of a first determination region which is included in both the image region of the entire document sheet image in the state where the document sheet is not tilted and the image region of the entire document sheet image in the state where the document sheet is tilted at the maximum tilt angle. The first tilt correction processing portion executes tilt correction processing for the document sheet image when the read image is not a blank sheet image, and executes no tilt correction processing for the document sheet image when the read image is a blank sheet image.

An image processing method according to another aspect of the present disclosure includes the following. An image is read in a reading range including image regions of an entire document sheet image in both a state where a document sheet is not tilted and a state where the document sheet is tilted at a predetermined maximum tilt angle. It is determined whether the read image is a blank sheet image, based on an image of a first determination region which is included in both the image region of the entire document sheet image in the state where the document sheet is not tilted and the image region of the entire document sheet image in the state where the document sheet is tilted at the maximum tilt angle. Tilt correction processing for the document sheet image is executed when the read image is not a blank sheet image, and no tilt correction processing for the document sheet image is executed when the read image is a blank sheet image.

A storage medium according to another aspect of the present disclosure is a non-transitory computer-readable storage medium having non-transitorily stored therein an image processing program causing a computer to execute the following. An image is read in a reading range including image regions of an entire document sheet image in both a state where a document sheet is not tilted and a state where the document sheet is tilted at a predetermined maximum tilt angle. It is determined whether the read image is a blank sheet image, based on an image of a first determination region which is included in both the image region of the entire document sheet image in the state where the document sheet is not tilted and the image region of the entire document sheet image in the state where the document sheet is tilted at the maximum tilt angle. Tilt correction processing for the document sheet image is executed when the read image is not a blank sheet image, and no tilt correction processing for the document sheet image is executed when the read image is a blank sheet image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
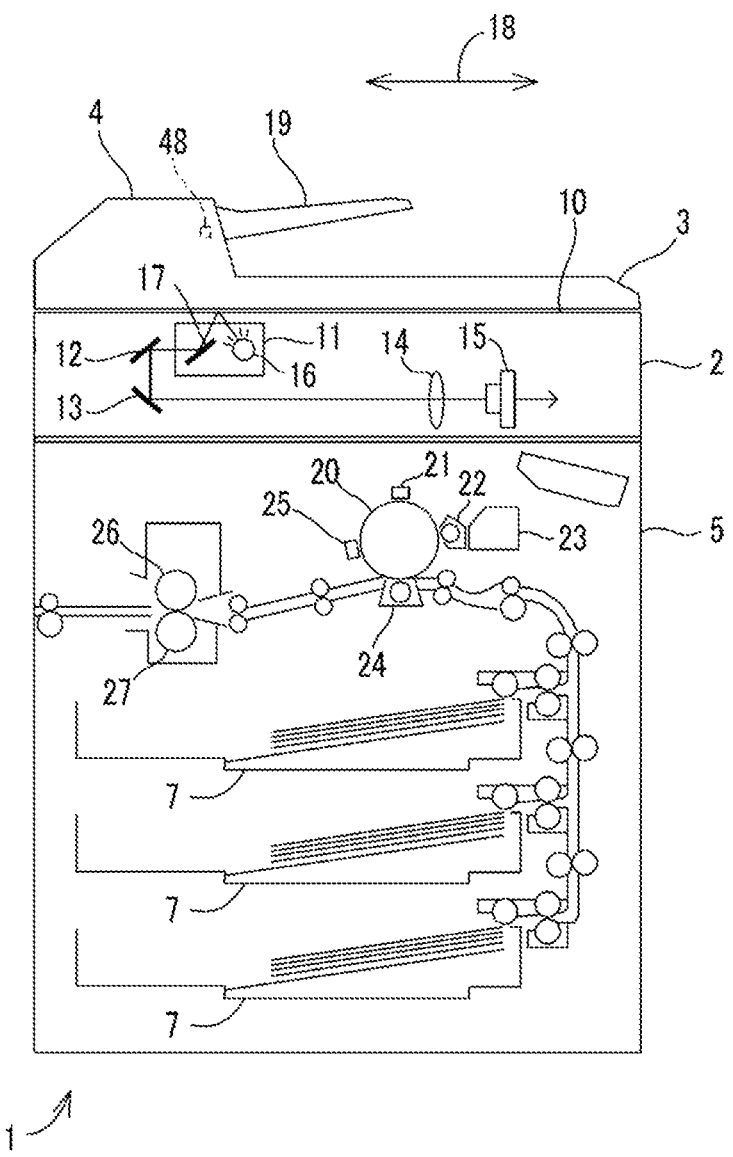
FIG. 1 is a schematic diagram illustrating an internal configuration of an image processing apparatus according to an embodiment of the present disclosure.

First, a schematic configuration of an image processing apparatus 1 according to an embodiment of the present disclosure will be described with reference to FIGS. 1 and 2. The image processing apparatus 1 is a multifunction peripheral having an image reading function, a facsimile function, an image forming function, and the like. As shown in FIG. 1, the image processing apparatus 1 includes an image reading portion 2, a document sheet cover 3, an auto document feeder (hereinafter referred to as ADF) 4, an image forming portion 5, an operation display portion 6 (refer to FIG. 2), sheet feed cassettes 7, a communication interface (I/F) portion 8 (refer to FIG. 2), and a control portion 9 (refer to FIG. 2) for controlling these components. The image processing apparatus 1 as a multifunction peripheral will be described as an example of the image processing apparatus of the present disclosure. However, the present disclosure is not limited thereto. For example, a printer, a facsimile device, a copy machine, or a scanner device also corresponds to the image processing apparatus of the present disclosure.

The image reading portion 2 executes image reading processing to read image data from a document sheet. As shown in FIG. 1, the image reading portion 2 includes a contact glass 10, a reading unit 11, mirrors 12 and 13, an optical lens 14, a CCD (Charge Coupled Device) 15, and the like.

The reading unit 11 includes an LED light source 16 and a mirror 17. The reading unit 11 is configured to be movable in a secondary scanning direction 18 (a right-left direction in FIG. 1) by a moving mechanism (not shown) using a driving motor such as a stepping motor. When the reading unit 11 is moved in the secondary scanning direction 18 by the driving motor, scanning in the secondary scanning direction 18 is performed with light applied from the LED light source 16 toward the contact glass 10 disposed on a top surface of the image reading portion 2.

When light is emitted from the LED light source 16, the mirror 17 reflects, toward the mirror 12, light reflected by a document sheet or a reverse surface of the document sheet cover 3. The light reflected by the mirror 17 is guided to the optical lens 14 through the mirrors 12 and 13. The optical lens 14 focuses the incident light onto the CCD 15.

The CCD 15 is a photoelectric converter that converts the received light to an electric signal (voltage) according to an amount of the received light (intensity of brightness), and outputs the electric signal to the control portion 9. The control portion 9 generates image data of the document sheet by subjecting the electric signal from the CCD 15 to image processing. In the present embodiment, an exemplary case where the CCD 15 is used as an imaging device is described. However, instead of the reading mechanism using the CCD 15, a reading mechanism including a contact image sensor (CIS) having a focal length shorter than that of the CCD 15 may be used.

To the image reading portion 2, the document sheet cover 3 is pivotably mounted. By the document sheet cover 3 being operated to pivot, the contact glass 10 on the top surface of the image reading portion 2 is opened or closed. In a pivoting support portion of the document sheet cover 3, a cover-opening detection sensor (not shown) such as a limit switch is provided. When a user opens the document sheet cover 3 to cause the image reading portion 2 to read an image of a document sheet, the cover-opening detection sensor is actuated to output a detection signal (cover-opening detection signal) to the control portion 9.

The image reading portion 2 reads an image of a document sheet in the following procedure. First, the document sheet is placed on the contact glass 10, and the document sheet cover 3 is then caused to be in a closed position. Thereafter, when an image reading instruction is input through the operation display portion 6, one line of light is sequentially applied continuously from the LED light source 16 while the reading unit 11 is being moved rightward in the secondary scanning direction 18. Then, light reflected by the document sheet or the reverse surface of the document sheet cover 3 is guided to the CCD 15 through the mirrors 17, 12 and 13 and the optical lens 14, and light amount data based on the amount of light received by the CCD 15 is sequentially output to the control portion 9. When the light amount data for the entirety of the region to which the light has been applied is obtained, the control portion 9 processes the light amount data to generate image information of the document sheet based on the light amount data. The image information is image information of a rectangular image, for example.

The CCD 15 is composed of a plurality of pixels. The control portion 9 generates, for example, clock signals such as a timing signal for integration start/end (exposure start/end), and a reading control signal (a horizontal synchronizing signal, a vertical synchronizing signal, a transfer signal, etc.) for controlling reading of a photodetection signal from each pixel, and outputs these clock signals to the CCD 15, thereby controlling an operation of outputting a pixel signal from each pixel. The control portion 9 (a later-described reading control portion 902; refer to FIG. 2) can select pixels to be caused to output pixel signals, based on the horizontal synchronizing signal and a vertical scanning signal. In the present embodiment, the control portion 9 obtains size information about the size of the document sheet in advance, sets a reading region larger than the document sheet size, and obtains image information of the reading region from the CCD 15. Hereinafter, a series of operations from when the LED light source 16 is lit up to when the CCD 15 outputs the pixel signals is referred to as a reading operation by the image reading portion 2. In addition, an image relating to image information output from the image reading portion 2 by the reading operation is referred to as a read image F1 (refer to FIG. 4).

The ADF 4 is provided in the document sheet cover 3. The ADF 4 sequentially conveys one or more document sheets set on a document sheet set portion 19, by means of a plurality of conveying rollers, and moves the document sheets rightward in the secondary scanning direction 18 through an automatic document sheet reading position defined on the contact glass 10. When the document sheet is moved by the ADF 4, the reading unit 11 is positioned below the automatic document sheet reading position, and an image of the document sheet being moved is read by the reading unit 11 at this position. A mechanical document sheet detection sensor 48 that can output a contact signal is provided in the document sheet set portion 19. When a document sheet is set on the document sheet set portion 19, the document sheet detection sensor 48 is actuated to output a detection signal (document sheet detection signal) to the control portion 9.

It is possible to detect whether a document sheet is set on the document sheet set portion 19, based on the document sheet detection signal output from the document sheet detection sensor 48. In addition, it is possible to detect the size of the document sheet in the document sheet conveyance direction (secondary scanning direction) based on a time period during which the document sheet detection signal is output after conveyance of the document sheet has started, and on the conveyance speed of the document sheet.

The ADF 4 includes a pair of document sheet guides, which are not shown, for restraining movement of a document sheet in a document sheet width direction perpendicular to the document sheet conveyance direction. The pair of document sheet guides are disposed so as to oppose each other in the main scanning direction (document sheet width direction). The pair of document sheet guides are slidable in opposite directions, and therefore, approach to each other and separate from each other. The image processing apparatus 1 includes a document sheet width sensor 49 (refer to FIG. 2) that detects the width of the document sheet (size of the document sheet in the main scanning direction) according to the amount of slide of the pair of document sheet guides. The size of the document sheet in the main scanning direction can be detected based on an output signal from the document sheet width sensor 49.

As shown in FIG. 1, the image forming portion 5 is an image forming portion of an electrophotographic type that executes image forming processing (printing processing) based on the image information read by the image reading portion 2 or on a printing job input from an external information processing apparatus such as a personal computer through the communication I/F portion 8. Specifically, the image forming portion 5 includes a photosensitive drum 20, a charging portion 21, a developing portion 22, a toner container 23, a transfer roller 24, an electricity removing portion 25, a fixing roller 26, a pressure roller 27, and the like. In the present embodiment, the image forming portion 5 of an electrophotographic type will be described as an example. However, the image forming portion 5 is not limited to an electrophotographic type, but may be an ink jet recording type, or may be other recording types or printing types.

In the image forming portion 5, image forming processing for a print sheet fed from the sheet feed cassette 7 is performed in the following procedure. First, when a printing job including a printing instruction is input through the communication I/F portion 8, the charging portion 21 uniformly charges the photosensitive drum 20 at a predetermined potential. Next, light based on image information included in the printing job is applied to the surface of the photosensitive drum 20 by a laser scanning unit (LSU), which is not shown. Thus, an electrostatic latent image is formed on the surface of the photosensitive drum 20. The electrostatic latent image on the photosensitive drum 20 is developed (visualized) as a toner image by the developing portion 22. Toner (developer) is supplied from the toner container 23 to the developing portion 22. Subsequently, the toner image formed on the photosensitive drum 20 is transferred onto the print sheet by the transfer roller 24. Thereafter, when the print sheet passes between the fixing roller 26 and the pressure roller 27 and is discharged, the toner image having been transferred onto the print sheet is heated by the fixing roller 26 to be fused and fixed onto the print sheet. The potential of the photosensitive drum 20 is removed by the electricity removing portion 25.

The communication I/F portion 8 is an interface that executes data communication with an external device connected to the image processing apparatus 1 via a communication network such as the Internet or a LAN. A storage portion 28 is composed of a nonvolatile memory such as a hard disc drive (HDD).

The control portion 9 includes a CPU (Central Processing Unit), a ROM (Read Only Memory), and a RAM (Random Access Memory). The CPU is a processor that executes various kinds of operational processing. The ROM is a nonvolatile storage portion in which information such as a control program for causing the CPU to execute the various kinds of processing is previously stored. The RAM is a volatile storage portion used as a temporary storage memory (working area) for the various kinds of processing executed by the CPU. The CPU executes the program stored in the ROM, whereby the control portion 9 controls the operation of the image processing apparatus 1.

In the ROM of the control portion 9, an image processing program that causes the CPU of the control portion 9 to execute image processing (refer to flowcharts of FIGS. 8 to 10) described later is previously stored. The image processing program may be stored in a non-transitory computer-readable storage medium such as a CD, a DVD, or a flash memory, and may be installed from the storage medium into a storage portion such as an EEPROM (registered trademark) of the control portion 9 or a not-illustrated hard disk. The present disclosure may be understood as a method of executing process steps of the image processing in the image processing apparatus 1, an image processing program for causing the control portion 9 to execute the process steps of the image processing, or a non-transitory computer-readable storage medium having stored therein the image processing program.

The operation display portion 6 includes a display portion 29 and an operation portion 30. The display portion 29 includes, for example, a color liquid crystal display, and displays various kinds of information for a user who operates the operation display portion 6. The operation portion 30 includes various types of push button keys disposed adjacent to the display portion 29, a touch panel sensor disposed on a display screen of the display portion 29, and the like. Various kinds of instructions are input to the operation portion 30 by the user of the image processing apparatus 1. When the user performs an operation to the operation display portion 6 to cause the image processing apparatus 1 to execute at least one of an image reading operation and an image forming operation, an operation signal corresponding to the user's operation is output from the operation display portion 6 to the control portion 9.

The image processing apparatus 1 of the present embodiment has a blank sheet determination function of, when reading an image of a document sheet, determining whether each page (each read surface) is a page with a rendered image or a page of a blank sheet with no rendered image. The blank sheet determination function is particularly effective when the image processing apparatus 1 reads a plurality of document sheets stacked in a bundle (a bundle of document sheets), placed on the document sheet set portion 19 of the ADF 4. That is, there may be a case where a document sheet having no rendered image is included in the bundle of document sheets, or a case where a one-side-blank sheet is included in the bundle of document sheets when the image processing apparatus 1 is set to read both sides of each document sheet. In such a case, the blank sheet determination function detects the page having no rendered image, whereby a read image F1 corresponding to this page can be discarded to avoid useless processing relating to the read image F1.

Conventionally, a tilt correction technique has been known which corrects, by image processing, a tilt of a document sheet image, which is caused by dislocation or the like of the document sheet when the document sheet is read. The document sheet image is an image of the entire document sheet, including an image of a blank portion thereof. When such a tilt correction function is mounted on an image processing apparatus having a blank sheet determination function, the following issues should be considered.

Upon execution of tilt correction, there is a case where a read image F1 is generated by reading a region larger than the size of a document sheet, taking into consideration a tilt of a document sheet image. If a determination region for blank sheet determination is set with respect to the read image F1 by means of distances from top, bottom, left, and right sides of the document sheet, there may occur a situation, depending on the size of the set determination region, the size of the determination region becomes larger than the size of the document sheet. When the size of the determination region is larger than the size of the document sheet, the determination region includes an excess region that is not included in the image region of the document sheet. Image information obtained from the excess region causes noise when blank sheet determination is performed. If blank sheet determination is performed based on the image including such noise, there is a possibility that appropriate blank sheet determination is not performed. In other words, there is a possibility that precision of the blank sheet determination is degraded.

In this regard, it is conceivable that the determination region setting target regarding the blank sheet determination is not the read image F1 but the document sheet image after tilt correction. However, if the determination region setting target regarding the blank sheet determination is uniquely set to the document sheet image after tilt correction, blank sheet determination will be executed after tilt correction processing is ended. In this case, the document sheet image determined as a blank sheet, i.e., an originally unnecessary document sheet image, is subjected to tilt correction, resulting in useless processing. On the other hand, in the image processing apparatus 1 according to the present embodiment, as described later, blank sheet determination is performed while omitting execution of useless tilt correction processing.

The image processing apparatus 1 of the present embodiment has a tilt correction function of correcting, by image processing (tilt correction processing), a tilt of a document sheet image F2 (refer to FIG. 4) which is caused by, for example, dislocation of a document sheet when the document sheet is read. Further, in the image processing apparatus 1, a plurality of determination methods described below are available in order to perform the blank sheet determination in the case where the tilt correction processing is performed, and modes (such as speed priority mode described later) corresponding to the respective methods are set.

The operation portion 30 includes a mode setting operation portion 31 for performing an operation to set the operation mode of the image processing apparatus 1 to a tilt correction mode that is an execution mode of the tilt correction function. Further, the tilt correction mode includes a speed priority mode, a precision priority mode, and a user's setting priority mode, depending on the determination method of the blank sheet determination processing. The mode setting operation portion 31 may perform an operation to set any of these modes. The mode setting operation portion 31 is, for example, an operation key for a predetermined mode setting screen (not shown) displayed on the display portion 29.

The blank sheet determination processing is, as described later, performed based on image information of either image, according to each of the above modes, of the read image F1 or the document sheet image F2 after the tilt correction. In the user's setting priority mode, the blank sheet determination processing is performed based on the image information of the read image F1. Specifically, the blank sheet determination processing is performed based on image information of an image of a determination region selected by the user in the read image F1. The operation portion 30 includes a determination region setting operation portion 32 with which the user sets the determination region (hereinafter referred to as a second determination region). In the present embodiment, the determination region setting operation portion 32 is distance input portions 201 to 204 described later which are displayed on a determination region setting screen 200 shown in FIG. 3.

Figure 3:
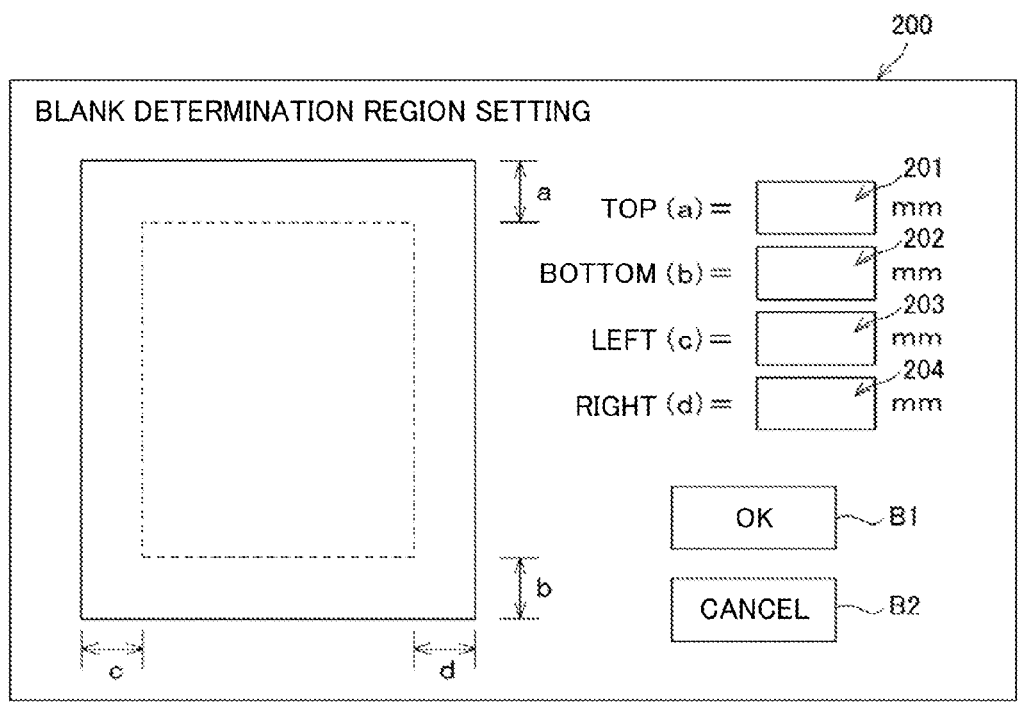
FIG. 3 is a diagram illustrating a determination region setting screen.

The second determination region is a rectangular region defined by a plurality of line segments (sides) spaced apart inward from the sides constituting an outer shape (rectangle) of the read image F1. The determination region setting screen 200 shown in FIG. 3 is a screen that allows setting of the distances from the sides constituting the outer shape of the read image F1 to the sides of the second determination region. Specifically, on the determination region setting screen 200, the distance input portions 201, 202, 203 and 204 that allow input of separation distances a, b, c and d are provided. The separation distance a is a distance between a top side of the outer shape of the read image F1 and a top side of the rectangle that defines the second determination region. The separation distance b is a distance between a bottom side of the outer shape of the read image F1 and a bottom side of the rectangle that defines the second determination region. The separation distance c is a distance between a left side of the outer shape of the read image F1 and a left side of the rectangle that defines the second determination region. The separation distance d is a distance between a right side of the outer shape of the read image F1 and a right side of the rectangle that defines the second determination region. The user touches a display position of any of the distance input portions 201 to 204 corresponding to the separation distance that the user desires to set, and inputs a numerical value using a numeric keypad (not shown) of the operation portion 30. Thus, the user can set the separation distance corresponding to the distance input portion touched by the user. The operation portion 30 receives the input regarding the separation distance, as an input to set the size and the position of the determination region with respect to the read image F1.

Figure 2:
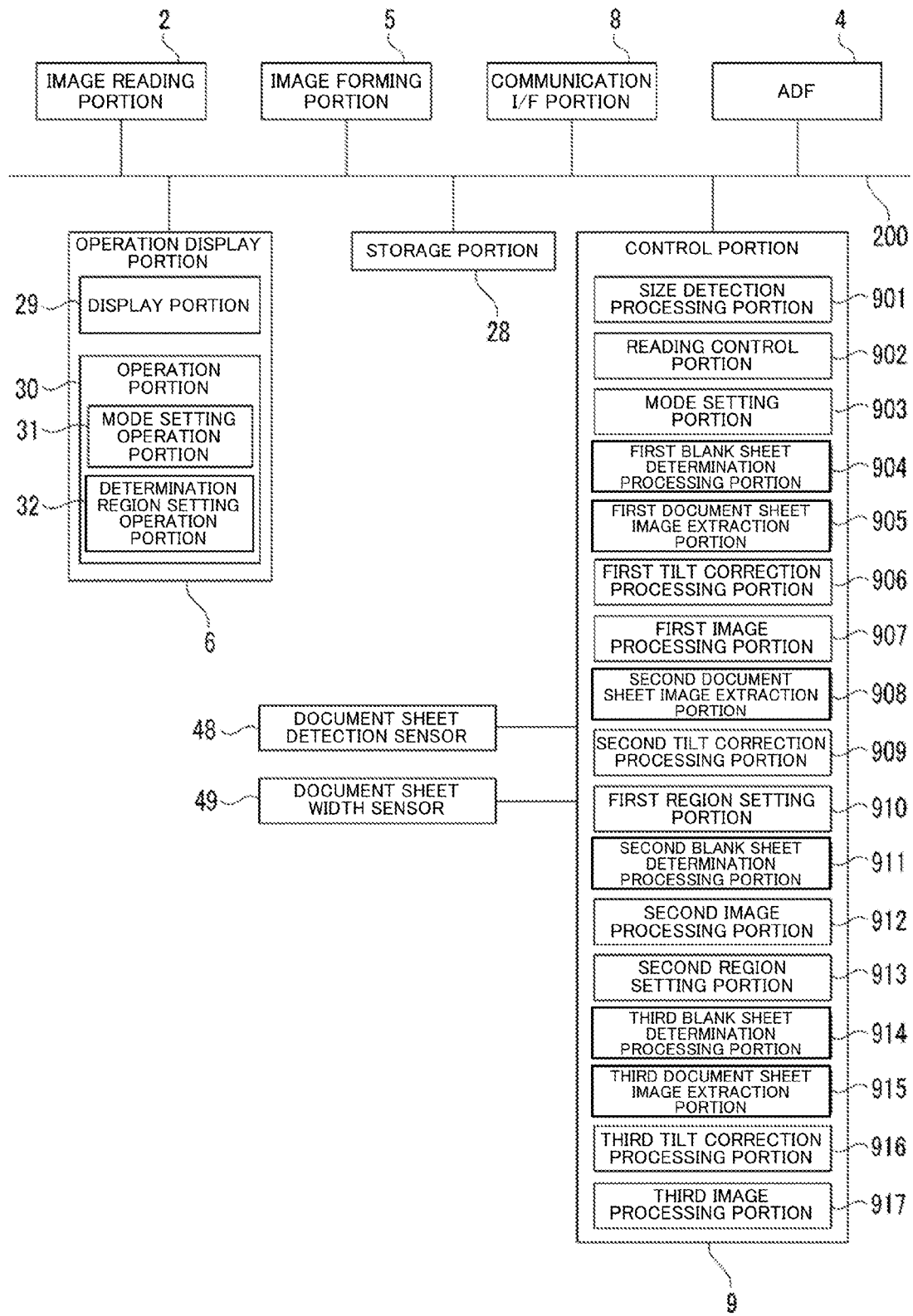
FIG. 2 is a block diagram illustrating an example of an electric configuration of the image processing apparatus according to the embodiment of the present disclosure.

As shown in FIG. 2, the control portion 9, by executing the above-described image processing program with the CPU, acts as a size detection processing portion 901, a reading control portion 902, a mode setting portion 903, a first blank sheet determination processing portion 904, a first document sheet image extraction portion 905, a first tilt correction processing portion 906, a first image processing portion 907, a second document sheet image extraction portion 908, a second tilt correction processing portion 909, a first region setting portion 910, a second blank sheet determination processing portion 911, a second image processing portion 912, a second region setting portion 913, a third blank sheet determination processing portion 914, a third document sheet image extraction portion 915, a third tilt correction processing portion 916, and a third image processing portion 917. It is also conceivable as another embodiment that part or a plurality of the functions of the control portion 9 are implemented as electronic circuits.

The size detection processing portion 901 detects the size of a document sheet based on signals output from the document sheet detection sensor 48 and the document sheet width sensor 49. The size detection processing portion 901 detects the size of the document sheet in the document sheet conveyance direction (secondary scanning direction), based on a time period during which the document sheet detection sensor 48 outputs the document sheet detection signal after conveyance of the document sheet has started, and on the conveyance speed of the document sheet. In addition, the size detection processing portion 901 detects the size of the document sheet in the main scanning direction, based on the output signal from the document sheet width sensor 49 (refer to FIG.

2). The size detection processing portion 901 detects the size of the document sheet based on the results of the above detections.

The reading control portion 902 controls the operation of the CCD 15. Specifically, the reading control portion 902 selects pixels to be caused to output pixel signals, based on the vertical scanning signal and the horizontal synchronizing signal, and causes the pixels to output pixel signals.

Figure 4:
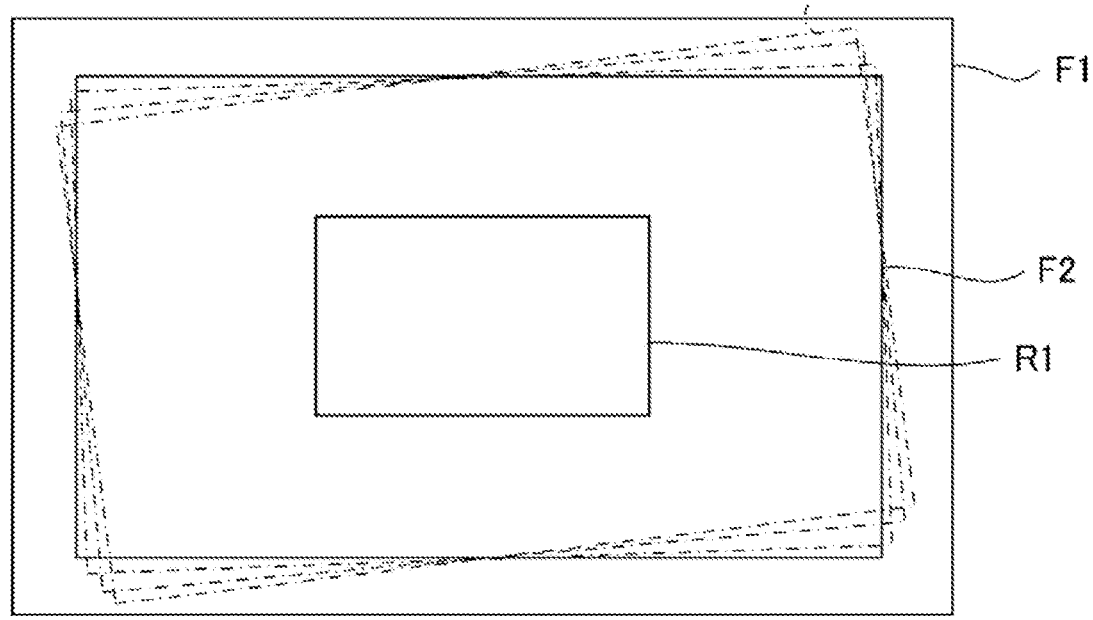
FIG. 4 is a diagram illustrating the relationship between the orientation of a document sheet image and the orientation of a read image in the case where the document sheet image is tilted.

In the present embodiment, when the image processing apparatus 1 is set in the tilt correction mode as described above, the reading control portion 902 causes the CCD 15 to output, as image information of the read image F1, image information of a region larger than the document sheet size detected by the size detection processing portion 901. This is because a tilt of the document sheet image F2 is considered. That is, as shown in FIG. 4, a region in which pixels are caused to output pixel signals is set to a region (reading range) in which the document sheet image F2 is included in the read image F1 regardless of to what extent the document sheet image F2 is tilted within a range up to predetermined maximum tilt angle. Thereby, regardless of to what extent the document sheet image F2 is tilted within the range up to the predetermined maximum tilt angle, the document sheet image F2 can be reliably extracted from the read image F1. Specifically, the reading range includes image regions of the entire document sheet image in both a state where the document sheet is not tilted and a state where the document sheet is tilted at the maximum tilt angle. The state where the document sheet is tilted at the maximum tilt angle is a state where the document sheet, which is not tilted, rotates by the maximum tilt angle about the center of the document sheet. In addition, the reading range may be a rectangular range that is constituted by sides parallel to the main scanning direction and the secondary scanning direction and circumscribes each of vertexes of the document sheet image when the document sheet is tilted at the maximum tilt angle, or may be a range larger than the rectangular range. Such a reading range has been previously set according to the document sheet size, and information relating to the reading range has been previously stored in the storage portion 28. In product inspection or the like, it may be found that the magnitude of the maximum tilt angle varies among individual ADFs 4 due to manufacturing errors or the like of the ADFs 4 in the image processing apparatuses 1. In such a case, taking the variation into consideration, the largest maximum tilt angle among the maximum tilt angles of the respective image processing apparatuses 1 or an angle obtained by adding a predetermined adjustment value to the largest maximum tilt angle may be previously determined as the maximum tilt angle of each image processing apparatus 1.

When the mode setting operation portion 31 has performed a setting operation to set the tilt correction mode, the mode setting portion 903 sets the operation mode of the image processing apparatus 1 to the tilt correction mode. In addition, when a setting operation to set any mode among the speed priority mode, the precision priority mode, and the user's setting priority mode has been performed, the mode setting portion 903 sets the operation mode of the image processing apparatus 1 to the mode.

When the speed priority mode is set by the mode setting portion 903, blank sheet determination processing is performed before the tilt correction processing. In this case, as shown in FIG. 4, it is unknown how much degree the document sheet image F2 is tilted at the time point when the blank sheet determination processing is performed. Therefore, the image of the determination region R1 (first determination region R1) to be subjected to the blank sheet determination processing needs to be included in the document sheet image F2 regardless of to what extent the document sheet image F2 is tilted within the range up to the maximum tilt angle. Therefore, the first determination region in the speed priority mode is set to a relatively small size. Specifically, the determination region R1 is a region included in both the image region of the entire document sheet image in the state where the document sheet is not tilted and the image region of the entire document sheet image in the state where the document sheet is tilted at the maximum tilt angle.

In the speed priority mode, since the determination region (first determination region R1) used for the blank sheet determination processing is relatively small, the amount of the image information to be processed by the blank sheet determination processing is small, and therefore, the processing time required for the blank sheet determination processing is short. Thus, the speed priority mode is a mode in which importance is placed on reduction in the processing time required for the blank sheet determination processing.

When the precision priority mode is set by the mode setting portion 903, the blank sheet determination processing is performed after the tilt correction processing. Further, in this mode, the determination region R2 (second determination region R2; refer to FIG. 6) to be subjected to the blank sheet determination processing is set to a size according to the image size of the document sheet image F2 after the tilt correction. Therefore, the size of the second determination region is larger than that of the first determination region R1 in the speed priority mode, and the amount of the image information to be subjected to the blank sheet determination processing is larger than that of the first determination region R1. Therefore, in the precision priority mode, the time required for the blank sheet determination processing is longer than that in the speed priority mode. On the other hand, since the blank sheet determination processing is performed on the determination region R2 (second determination region R2) larger than the first determination region R1 in the speed priority mode, the blank sheet determination processing is performed with higher precision as compared to the speed priority mode. Thus, the precision priority mode is a mode in which importance is placed on precision of the blank sheet determination processing.

When the user's setting priority mode is set by the mode setting portion 903, the determination region setting screen 200 is displayed on the display portion 29 as described later. Then, a determination region, in the read image F1, obtained based on the separation distances a to d (refer to FIG. 3) set by the user on the determination region setting screen 200 is set as the second determination region R2 to be subjected to the blank sheet determination processing. Then, the blank sheet determination processing is performed based on the image of the second determination region R2.

As described above, the image processing apparatus 1 has the precision priority mode, and therefore, can precisely detect whether the document sheet image F2 is a blank sheet image. In addition, the image processing apparatus 1 has the speed priority mode and the precision priority mode, and the image processing apparatus 1 is set to one of these modes according to a user's selection operation. Thereby, the user can cause the image processing apparatus 1 to perform the blank sheet determination processing in his/her desired mode. Further, the image processing apparatus 1 has the user's setting priority mode. Thereby, the user can freely set the determination region R2 (second determination region R2) to be subjected to the blank sheet determination processing.

The first blank sheet determination processing portion 904 performs the blank sheet determination processing in the case where the speed priority mode is set by the mode setting portion 903. Specifically, the first blank sheet determination processing portion 904 reads, from the storage portion 28, region information of the first determination region R1 corresponding to the document sheet size detected by the size detection processing portion 901, and obtains, using the region information, the image information of the first determination region R1 to be subjected to the blank sheet determination processing. Then, the first blank sheet determination processing portion 904 determines whether the read image F1 is a blank sheet image, based on whether the image of the first determination region R1 is a white image. The first blank sheet determination processing portion 904 counts the number of pixels having a predetermined density among the pixels existing in the first determination region R1, and determines whether the count exceeds a predetermined threshold. If the count exceeds the predetermined threshold, the first blank sheet determination processing portion 904 determines that the image of the first determination region R1 is not a white image, and determines that the read image F1 is not a blank sheet image. On the other hand, if the count is less than the predetermined threshold, the first blank sheet determination processing portion 904 determines that the image of the first determination region R1 is a white image, and determines that the read image F1 is a blank sheet image.

Figure 5:
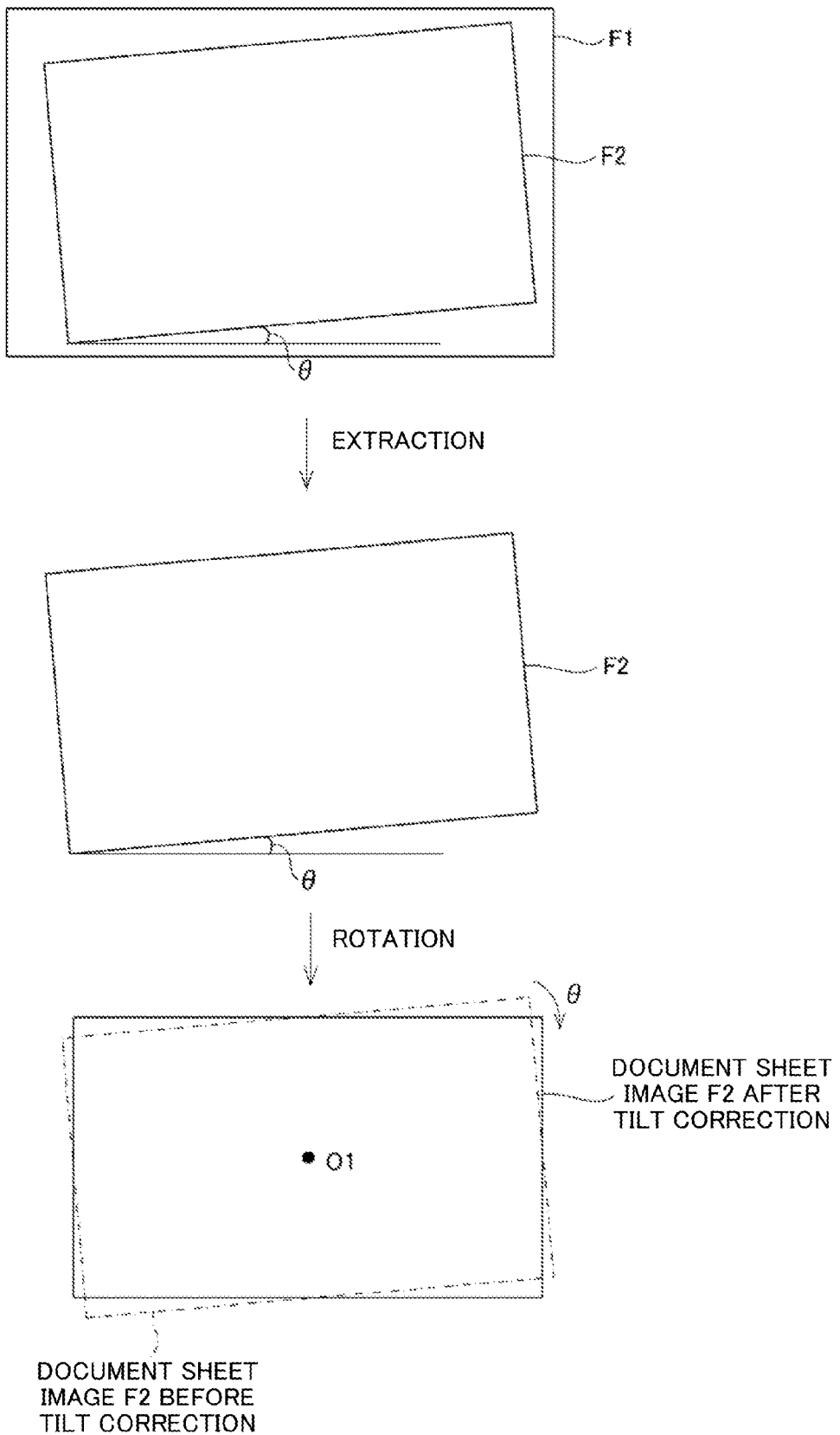
FIG. 5 is a diagram illustrating tilt correction.

When the first blank sheet determination processing portion 904 has determined that the read image F1 is not a blank sheet image, the first document sheet image extraction portion 905 detects the edges of the document sheet in the read image F1. Then, as shown in FIG. 5, the first document sheet image extraction portion 905 extracts, from the read image F1, an image of a rectangular region formed by the edges, as the document sheet image F2.

If the document sheet image F2 extracted by the first document sheet image extraction portion 905 is tilted, the first tilt correction processing portion 906 performs correction processing to eliminate the tilt. Specifically, as shown in FIG. 5, if the document sheet image F2 extracted by the first document sheet image extraction portion 905 has a tilt angle θ, the first tilt correction processing portion 906 performs a process of rotating the document sheet image F2 by a rotation angle (−θ) about the center O1 of the document sheet image F2.

The first image processing portion 907 outputs, to the image forming portion 5, the image information of the document sheet image F2 after the tilt correction by the first tilt correction processing portion 906. Thereby, the image forming portion 5 performs an image forming operation (printing operation) based on the image information.

On the other hand, when the first blank sheet determination processing portion 904 has determined that the read image F1 is a blank sheet image, the first image processing portion 907 performs a process of deleting the image information of the read image F1. Thereby, generation of a blank printed matter is prevented, and the first document sheet image extraction portion 905 and the first tilt correction processing portion 906 are prevented from performing useless processing. Thus, in the speed priority mode, useless extraction of the document sheet image F2 and useless tilt correction processing are omitted with respect to the read image F1 determined to be a blank sheet image by the first blank sheet determination processing portion 904.

When the precision priority mode is set by the mode setting portion 903, the second document sheet image extraction portion 908 extracts the document sheet image F2 from the read image F1. Since this extraction processing is identical to that of the first document sheet image extraction portion 905, repeated description is not necessary.

The second tilt correction processing portion 909 detects whether the document sheet image F2 extracted by the first document sheet image extraction portion 905 is tilted. If the document sheet image F2 is tilted, the second tilt correction processing portion 909 performs correction processing to eliminate the tilt. Since this correction processing is identical to that of the first tilt correction processing portion 906, repeated description is not necessary.

Figure 6:
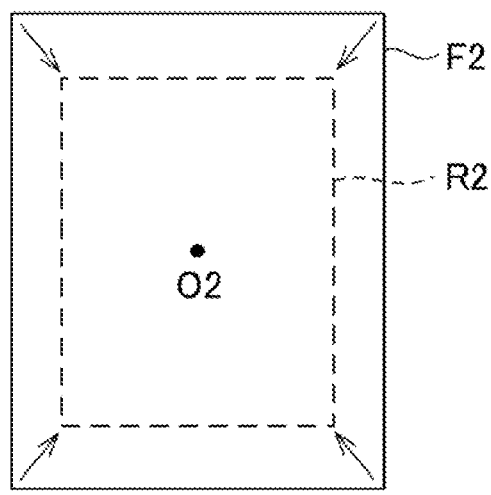
FIG. 6 is a diagram illustrating a second determination region setting method in a precision priority mode.

For the document sheet image F2 after the tilt correction by the second tilt correction processing portion 909 or the document sheet image F2 determined by the second tilt correction processing portion 909 as being not tilted, the first region setting portion 910 sets the determination region R2 (second determination region R2) for the blank sheet determination processing according to the size of the document sheet image F2. For example, the first region setting portion 910 sets, as the second determination region R2, a region obtained by reducing the outer shape of the document sheet image F2 at a preset reduction rate toward the center of the document sheet image F2 after the tilt correction. For example, as shown in FIG. 6, when a vertical reduction rate is set to 80(%) and a horizontal reduction rate is set to 70(%), the first region setting portion 910 sets, as the second determination region, a region obtained by reducing the outer shape of the document sheet image F2 toward the center O2 of the document sheet image F2 after the tilt correction, at a reduction rate of 80(%) for the vertical length and a reduction rate of 70(%) for the horizontal length. It is also conceivable to set, as the second determination region R2, a region obtained by reducing the outer shape of the document sheet image F2 toward the center of the document sheet image F2 at a preset reduction rate, while maintaining the aspect ratio of the outer shape of the document sheet image F2. The reduction rate at which the outer shape of the document sheet image F2 is reduced may be a predetermined value stored in the control portion 9, or may be set by the control portion 9 according to a user's operation on the operation portion 30.

The second blank sheet determination processing portion 911 determines whether the document sheet image F2 is a blank sheet image, based on whether the image of the second determination region R2 set by the first region setting portion 910 is a white image. Since the method of the blank sheet determination processing is identical to that of the first blank sheet determination processing portion 904, repeated description is not necessary.

When the second blank sheet determination processing portion 911 has determined that the document sheet image F2 is not a blank sheet image, the second image processing portion 912 causes the image forming portion 5 to perform an image forming operation based on the image information of the document sheet image F2 after the tilt correction.

On the other hand, when the second blank sheet determination processing portion 911 has determined that the document sheet image F2 is a blank sheet image, the second image processing portion 912 preforms a process of deleting the image information of the document sheet image F2. Thus, generation of a blank printed matter is prevented.

Figure 7:
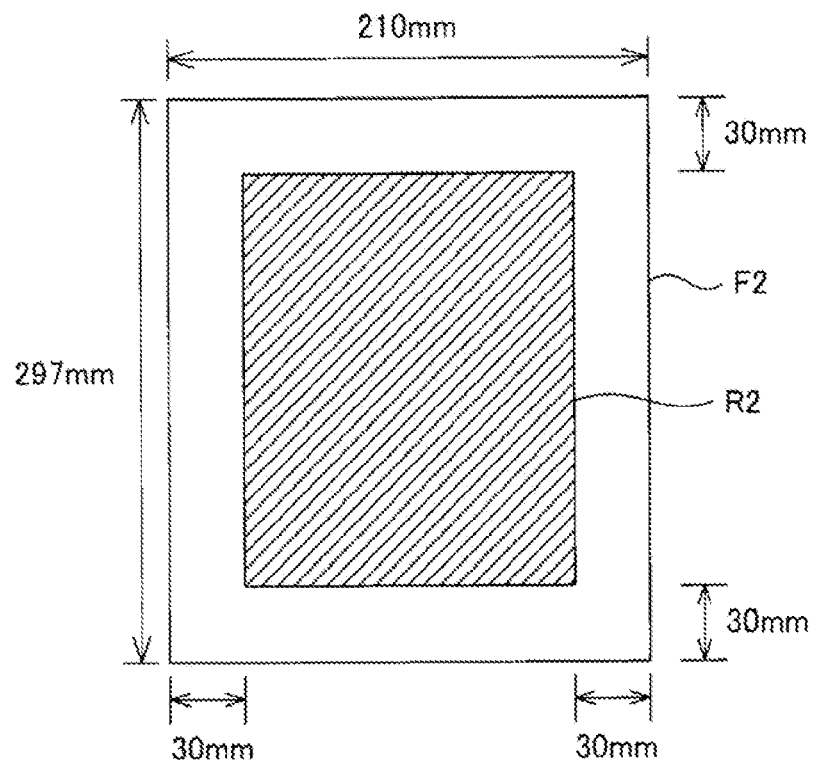
FIG. 7 is a diagram illustrating a second determination region setting method in a user's setting priority mode.

When the user's setting priority mode is set by the mode setting portion 903, the second region setting portion 913 causes the display portion 29 to display the determination region setting screen 200. Then, the second region setting portion 913 sets the second determination region R2 in the read image F1, based on input information to the determination region setting screen 200, which is received from the operation portion 30. For example, it is assumed that, as shown in FIG. 7, the read image F1 is an image of a rectangular shape having a height of 297 mm and a width of 210 mm, and the separation distance a=b=c=d=30 mm is input to the determination region setting screen 200. In this case, the second region setting portion 913 sets, as the second determination region, a rectangular region having a height of 237 mm and a width of 150 mm, which is obtained by excluding, from the read image F1, a band-like region having a width of 30 mm along the top, bottom, left and right sides of the read image F1.

The third blank sheet determination processing portion 914 determines whether the read image F1 is a blank sheet image, based on whether the image of the second determination region R2 set by the second region setting portion 913 is a white image. Since the method of the blank sheet determination processing is identical to that of the second blank sheet determination processing portion 911, repeated description is not necessary.

When the third blank sheet determination processing portion 914 has determined that the read image F1 is not a blank sheet image, the third document sheet image extraction portion 915 extracts the document sheet image F2 from the read image F1. Since the extraction processing is identical to that of the first document sheet image extraction portion 905, repeated description is not necessary.

The third tilt correction processing portion 916 detects whether the document sheet image F2 extracted by the third document sheet image extraction portion 915 is tilted. If the document sheet image F2 is tilted, the third tilt correction processing portion 916 performs correction processing to eliminate the tilt. Since this correction processing is identical to that of the first tilt correction processing portion 906, repeated description is not necessary.

The third image processing portion 917 causes the image forming portion 5 to perform an image forming operation based on the image information of the document sheet image F2 after the tilt correction by the third tilt correction processing portion 916, or on the image information of the document sheet image F2 determined by the third tilt correction processing portion 916 as being not tilted.

On the other hand, when the third blank sheet determination processing portion 914 has determined that the read image F1 is a blank sheet image, the third image processing portion 917 performs a process of deleting the image information of the read image F1. Thereby, generation of a blank printed matter is prevented.

Figure 8:
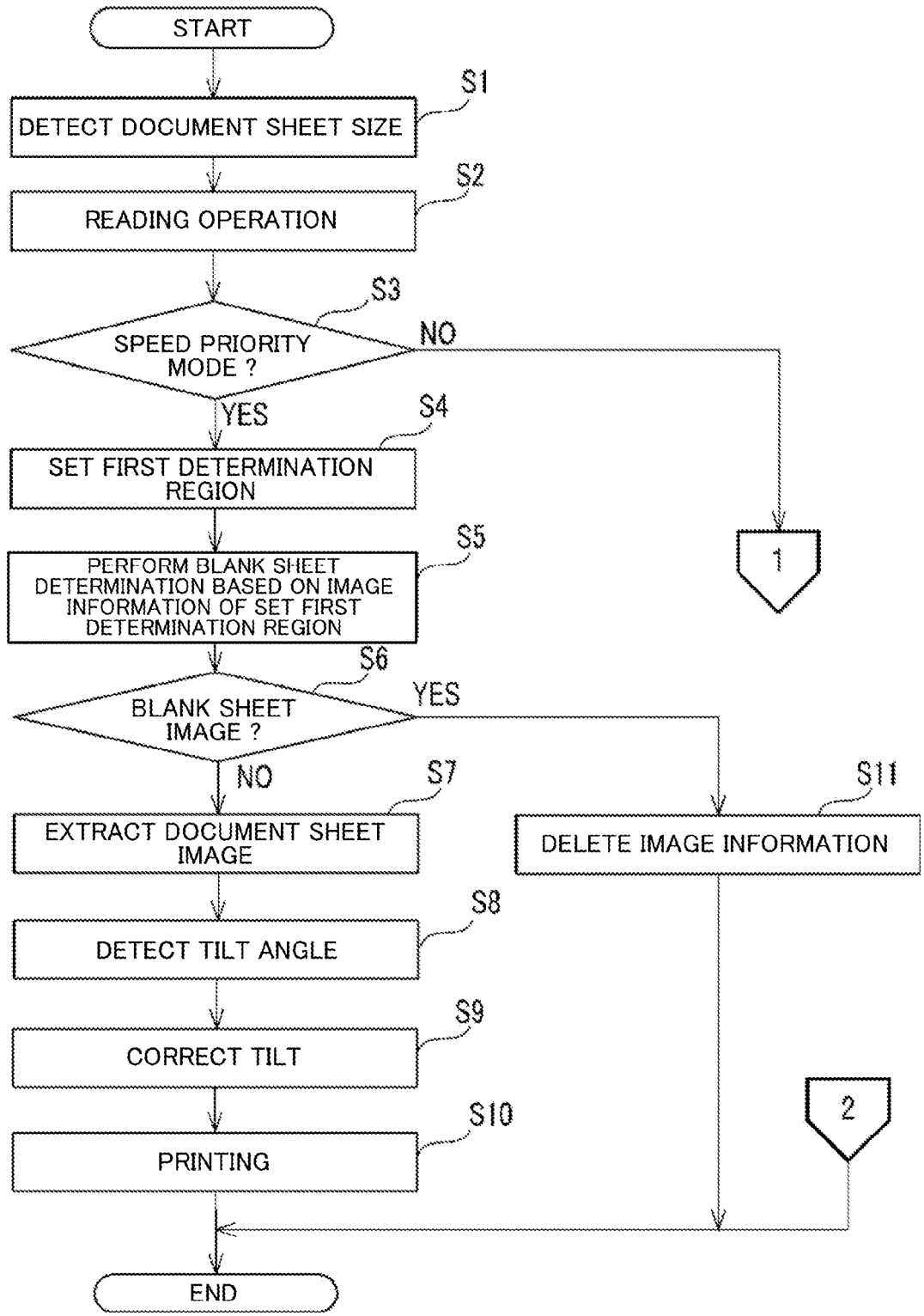
FIG. 8 is a flowchart illustrating a flow of a series of processing stages including blank sheet determination processing performed in a tilt correction mode by a control portion of the image processing apparatus according to the embodiment of the present disclosure.
Figure 9:
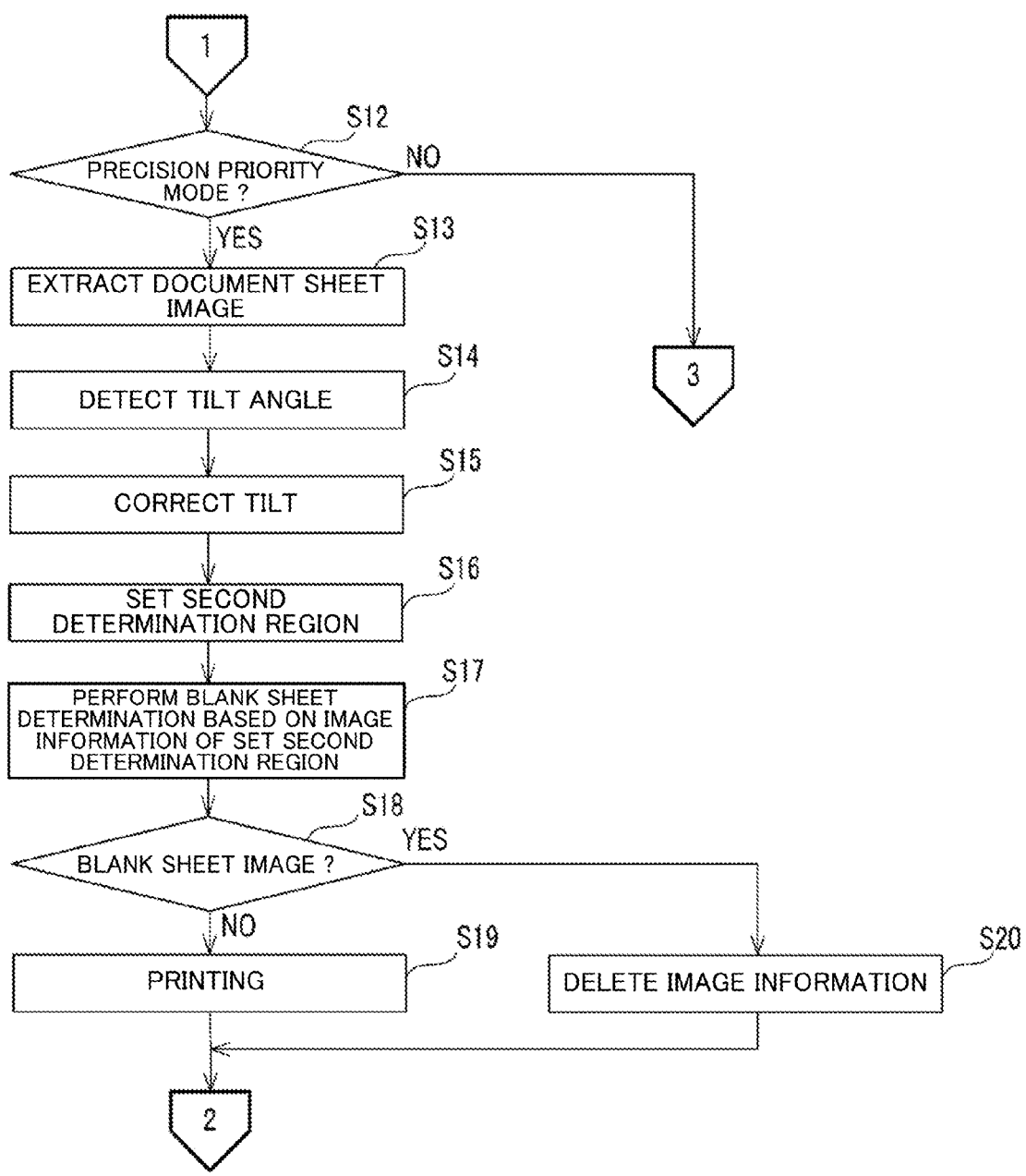
FIG. 9 is a flowchart illustrating a flow of a series of processing stages including the blank sheet determination processing performed in the tilt correction mode by the control portion of the image processing apparatus according to the embodiment of the present disclosure.
Figure 10:
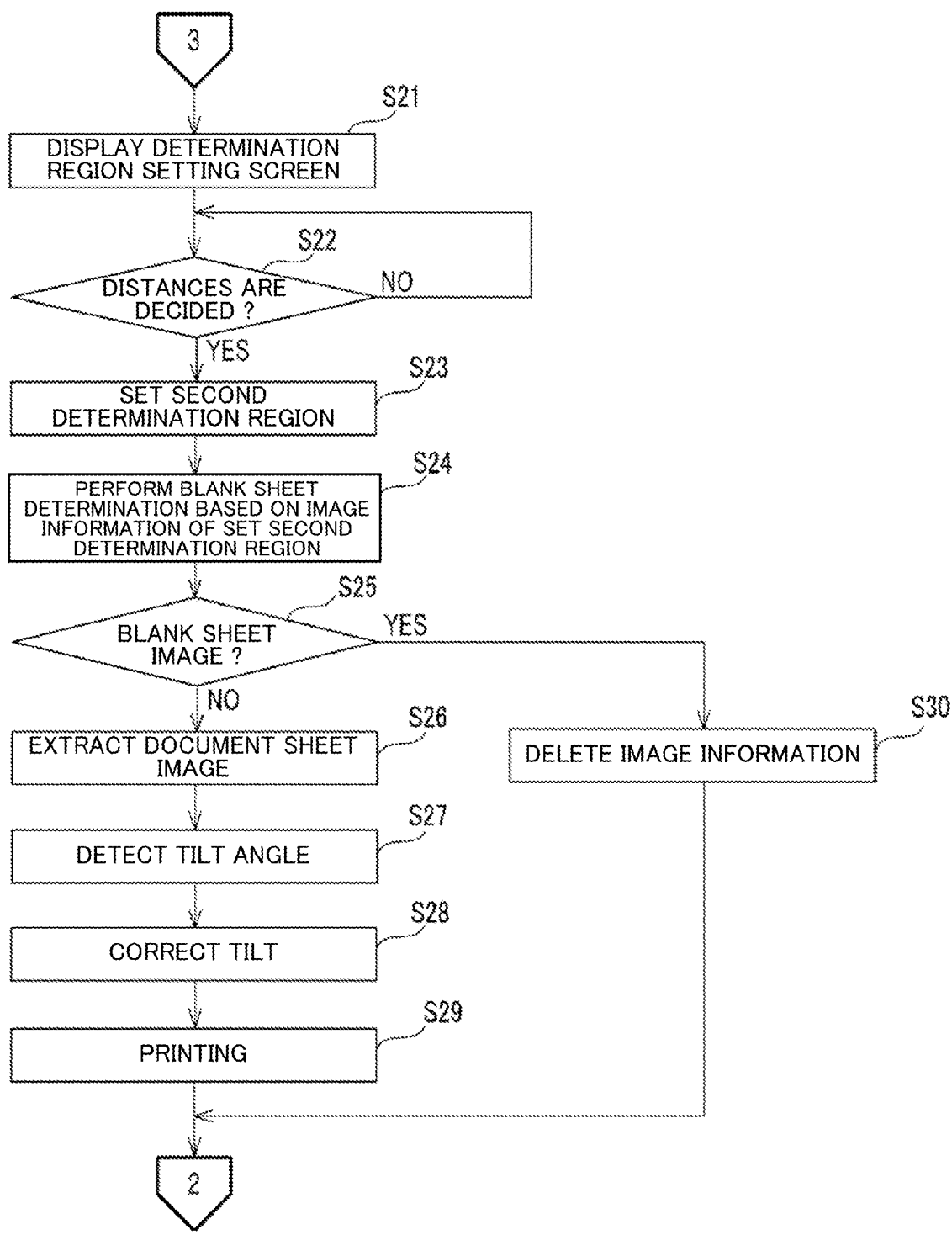
FIG. 10 is a flowchart illustrating a flow of a series of processing stages including the blank sheet determination processing performed in the tilt correction mode by the control portion of the image processing apparatus according to the embodiment of the present disclosure.

Hereinafter, a flow of a series of processing stages including the blank sheet determination processing executed by the control portion 9 during the tilt correction mode will be described with reference to FIGS. 8 to 10. This processing is started when document sheets are set on the document sheet set portion 19, and a reading start instruction is input. It is assumed that, before execution of this processing, the image processing apparatus 1 has already been set in any of the operation modes (speed priority mode, precision priority mode, and user's setting priority mode) for the tilt correction mode. In addition, in the flowcharts of FIGS. 8 to 10, steps S1, S2, . . . represent the numbers of steps in the processing procedure. Further, a case is assumed where an image of one document sheet is read.

When a reading instruction is input to the operation portion 30 by a user, the control portion 9 causes the ADF 4 to start a document sheet conveyance operation. Based on signals output from the document sheet detection sensor 48 and the document sheet width sensor 49, the size detection processing portion 901 detects the size of a document sheet (step S1). In addition, the control portion 9 causes the image reading portion 2 to perform a reading operation (step S2). At this time, the control portion 9 causes the CCD 15 to output, as the image information of the read image F1, image information of a predetermined region larger than the document sheet size detected by the size detection processing portion 901.

If the image processing apparatus 1 is set in the speed priority mode by the mode setting portion 903 (YES in step S3), the first blank sheet determination processing portion 904 sets the first determination region R1 to be subjected to the blank sheet determination processing (step S4). As described above, the first determination region R1 is a determination region having a size that can be included in the document sheet image F2 regardless of to what extent the document sheet image F2 is tilted within the range up to the maximum tilt angle. Then, the first blank sheet determination processing portion 904 determines whether the read image F1 is a blank sheet image, based on whether the image of the first determination region R1 is a white image (step S5).

If the first blank sheet determination processing portion 904 has determined that the read image F1 is not a blank sheet image (NO in step S6), the first document sheet image extraction portion 905 extracts the document sheet image F2 from the read image F1 (step S7). The first tilt correction processing portion 906 detects a tilt angle θ of the extracted document sheet image F2 (step S8). If the extracted document sheet image F2 is tilted, the first tilt correction processing portion 906 corrects the tilt (step S9). Then, the first image processing portion 907 causes the image forming portion 5 to perform an image forming operation (printing operation) based on the image information of the document sheet image F2 after the tilt correction (step S10). If the reading operation executed by the image processing apparatus 1 is image reading processing such as network scan processing or facsimile processing, the image information of the document sheet image 101 is transmitted to a predetermined information processing apparatus via a network, or transmitted to a predetermined facsimile device.

On the other hand, in step S6, if the first blank sheet determination processing portion 904 has determined that the read image F1 is a blank sheet image (YES in step S6), the first image processing portion 907 performs a process of deleting the image information of the read image F1 (step S11).

In step S3, if the image processing apparatus 1 is set in the precision priority mode by the mode setting portion 903 (NO in step S3, YES in step S12), the second document sheet image extraction portion 908 extracts the document sheet image F2 from the read image F1 (step S13). The second tilt correction processing portion 909 detects a tilt angle of the extracted document sheet image F2 (step S14). If the document sheet image F2 is tilted, the second tilt correction processing portion 909 corrects the tilt (step S15).

Next, for the document sheet image F2 after the tilt correction by the second tilt correction processing portion 909 or the document sheet image F2 determined by the second tilt correction processing portion 909 as being not tilted, the first region setting portion 910 sets the second determination region R2 according to the size of the document sheet image F2 (step S16). Then, the second blank sheet determination processing portion 911 determines whether the document sheet image F2 is a blank sheet image, based on whether the image of the second determination region R2 set by the first region setting portion 910 is a white image (step S17).

If the second blank sheet determination processing portion 911 has determined that the document sheet image F2 is not a blank sheet image (NO in step S18), the second image processing portion 912 causes the image forming portion 5 to perform an image forming operation (printing operation)

based on the image information of the document sheet image F2 after the tilt correction (step S19). On the other hand, if, in step S18, the second blank sheet determination processing portion 911 has determined that the document sheet image F2 is a blank sheet image (YES in step S18), the second image processing portion 912 performs a process of deleting the image information of the document sheet image F2 (step S20).

If the image processing apparatus 1 is set in the user's setting priority mode by the mode setting portion 903 (NO in steps S3 and S12), the second region setting portion 913 causes the display portion 29 to display the determination region setting screen 200 (step S21). Then, the second region setting portion 913 determines whether operation information indicating that the separation distances input to the determination region setting screen 200 are decided is received (step S22).

The second region setting portion 913 stands by until receiving the operation information (NO in step S22). Upon determining that the operation information has been received (YES in step S22), the second region setting portion 913 sets the second determination region R2 in the read image F1 read by the image reading portion 2, based on the input information (distance information) to the determination region setting screen 200 (step S23). Then, the third blank sheet determination processing portion 914 determines whether the read image F1 is a blank sheet image, based on whether the image of the second determination region R2 is a white image (step S24).

If the third blank sheet determination processing portion 914 has determined that the read image F1 is not a blank sheet image (NO in step S25), the third document sheet image extraction portion 915 extracts the document sheet image F2 from the read image F1 (step S26). The third tilt correction processing portion 916 detects a tilt angle of the document sheet image F2 (step S27). If the document sheet image F2 is tilted, the third tilt correction processing portion 916 corrects the tilt (step S28).

Then, the third image processing portion 917 causes the image forming portion 5 to perform an image forming operation (printing operation) based on the image information of the document sheet image F2 after the tilt correction by the third tilt correction processing portion 916 or the image information of the document sheet image F2 determined by the third tilt correction processing portion 916 as being not tilted (step S29). On the other hand, if, in step S25, the third blank sheet determination processing portion 914 has determined that the read image F1 is a blank sheet image (YES in step S25), the third image processing portion 917 performs a process of deleting the image information of the document sheet image F2 (step S30).

As described above, the image processing apparatus 1 according to the present embodiment performs, in the speed priority mode, determination processing as to whether the read image F1 is a blank sheet image, based on the image of the first determination region R1 which is included in the document sheet image F2 tilted at any angle within the range up to the maximum tilt angle, in the speed priority mode. If the read image F1 is a blank sheet image, the image processing apparatus 1 performs the process of deleting the image information of the read image F1. Thereby, when the read image F1 is a blank sheet image, the first document sheet image extraction portion 905 and the first tilt correction processing portion 906 are prevented from performing useless processing. In addition, generation of a blank printed matter can be prevented.

Further, in the present embodiment, a region in which the document sheet image F2 is included in the read image F1 regardless of to what extent the document sheet image F2 is tilted within the range up to the predetermined maximum tilt angle, is set as a region in which pixels are caused to output pixel signals. Then, the image information of the image of this region is output from the CCD 15 as the image information of the read image F1. Thereby, regardless of to what extent the document sheet image F2 is tilted within the range up to the predetermined maximum tilt angle, the document sheet image F2 can be reliably extracted from the read image F1.

While the preferred embodiment of the present disclosure has been described, the present disclosure is not limited thereto, and may employ various modifications.

The image processing apparatus 1 according to the above embodiment has, as the tilt correction mode, three modes including the speed priority mode, the precision priority mode, and the user's setting priority mode. However, the image processing apparatus 1 need not have all of these modes, and may have at least the speed priority mode.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
a reading control portion configured to read an image within a reading range including an image region of an entire document sheet image of a document sheet in a respective state where the document sheet is not tilted and a respective state where the document sheet is tilted at a predetermined maximum tilt angle;
a first blank sheet determination processing portion configured to be able to determine whether the image read by the reading control portion is a blank sheet image, based on an image of a first determination region which is previously set as an overlapped region included in both the image region of the entire document sheet image in the state where the document sheet is not tilted and the image region of the entire document sheet image in the state where the document sheet is tilted at the maximum tilt angle;
a first tilt correction processing portion configured to, if the first blank sheet determination processing portion determines that the read image is not a blank sheet image, then determine whether the document sheet image contained within the read image is tilted, and if the document sheet image within the read image is tilted then execute tilt correction processing for the document sheet image within the read image, and, if the first blank sheet determination processing portion determines that the document sheet image within the read image is a blank sheet image, then refrain from determining whether the document sheet image is tilted and execute no tilt correction processing for the document sheet image within the read image;
a size detection processing portion configured to detect a size of a document sheet of the document sheet image; and
a storage portion configured to store region information of the first determination region corresponding to the size of the document sheet, wherein
the first blank sheet determination processing portion reads, from the storage portion, the region information of the first determination region corresponding to the size of the document sheet detected by the size detection processing portion, and determines whether the read image is a blank sheet image, using the region information.

2. The image processing apparatus according to claim 1 further comprising:
a second tilt correction processing portion configured to perform tilt correction processing for the document sheet image; and
a second blank sheet determination processing portion configured to be able to determine whether the document sheet image is a blank sheet image, based on an image of a second determination region previously set in the document sheet image whose tilt has been corrected by the second tilt correction processing portion, wherein the second determination region is larger in size than the first determination region.

3. The image processing apparatus according to claim 2, wherein the first blank sheet determination processing portion and the first tilt correction processing portion or the second blank sheet determination processing portion and the second tilt correction processing portion operate according to a predetermined selection operation.

4. The image processing apparatus according to claim 2, wherein the second determination region is a region set according to an operation in which a size thereof is previously set for each document sheet image.

5. The image processing apparatus according to claim 2, wherein the second determination region is a region obtained by reducing, at a preset reduction rate, an outer shape of the document sheet image whose tilt has been corrected by the second tilt correction processing portion, toward the center of the document sheet image.

6. The image processing apparatus according to claim 1, wherein the reading range is a rectangular range which is formed by sides parallel to a main scanning direction and a secondary scanning direction, and circumscribes each of vertexes of the document sheet image when the document sheet is tilted at the maximum tilt angle.

7. The image processing apparatus according to claim 6, wherein the state where the document sheet is tilted at the maximum tilt angle is a state obtained by rotating the document sheet, which is not tilted, by the maximum tilt angle about the center of the document sheet.

8. The image processing apparatus according to claim 1 further comprising an auto document feeder configured to convey the document sheet, wherein
the reading control portion reads an image from the document sheet conveyed by the auto document feeder.

9. An image processing method comprising:
reading an image within a reading range including an image region of an entire document sheet image of a document sheet in a respective state where the document sheet is not tilted and a respective state where the document sheet is tilted at a predetermined maximum tilt angle;
determining whether the read image is a blank sheet image, based on an image of a first determination region which is previously set as an overlapped region included in both the image region of the entire document sheet image in the state where the document sheet is not tilted and the image region of the entire document sheet image in the state where the document sheet is tilted at the maximum tilt angle;
if the image read is determined to not be a blank sheet image, then determining whether the document sheet image contained within the read image is tilted, and if the document sheet image within the read image is tilted then executing tilt correction processing for the document sheet image within the read image and, if the document sheet image within the read image is determined to be a blank sheet image, then refraining from determining whether the document sheet image is tilted and executing no tilt correction processing for the document sheet image within the read image;
detecting a size of a document sheet of the document sheet image; and
storing region information of the first determination region corresponding to the size of the document sheet, wherein
determining whether the read image is a blank sheet image comprises reading the stored region information of the first determination region corresponding to the size of the document sheet and determining whether the read image is a blank sheet image, using the region information.

10. A non-transitory computer-readable storage medium having non-transitorily stored therein an image processing program causing a computer to execute:
reading an image within a reading range including an image region of an entire document sheet image of a document sheet in a respective state where the document sheet is not tilted and a respective state where the document sheet is tilted at a predetermined maximum tilt angle;
determining whether the read image is a blank sheet image, based on an image of a first determination region which is previously set as an overlapped region included in both the image region of the entire document sheet image in the state where the document sheet is not tilted and the image region of the entire document sheet image in the state where the document sheet is tilted at the maximum tilt angle;
if the image read is determined to not be a blank sheet image, then determining whether the document sheet image contained within the read image is tilted, and if the document sheet image within the read image is tilted then executing tilt correction processing for the document sheet image within the read image, and, if the document sheet image within the read image is determined to be a blank sheet image, then refraining from determining whether the document sheet image is tilted and executing no tilt correction processing for the document sheet image within the read image;
detecting a size of a document sheet of the document sheet image; and
storing region information of the first determination region corresponding to the size of the document sheet, wherein
determining whether the read image is a blank sheet image comprises reading the stored region information of the first determination region corresponding to the size of the document sheet and determining whether the read image is a blank sheet image, using the region information.

* * * * *